United States Patent Office 3,717,231
Patented Feb. 20, 1973

3,717,231
POSITIVELY CUSHIONED STOP DEVICE FOR ROBOT SYSTEM
Roland T. A. Kaufeldt, Stambanevagen 81–83, Huddinge, Sweden
Filed Feb. 25, 1971, Ser. No. 118,622
Claims priority, application Sweden, Dec. 28, 1970, 17,543/70
Int. Cl. F16d 71/04
U.S. Cl. 192—139    5 Claims

ABSTRACT OF THE DISCLOSURE

A system for damping and subsequently stopping the rotative movement of a shaft carrying means for performing a robot function. A support for the shaft is provided with a progressive damper and continuously adjustable stop means, and the rotative shaft is provided with dog means for engaging first said progressive damper and thereafter said stop means when the rotative motion has been damped to a substantial extent.

BACKGROUND OF THE INVENTION

Field of the invention

This invention refers to a novel robot system including means for damping and subsequently stopping the rotative movement of a shaft, with said system being primarily intended for robots comprising arms adapted to be displaced longitudinally in the x, y, and z directions of a Cartesian coordinate system.

Description of the prior art

In industrial applications so-called robots may be utilized for performing various steps in operative cycles. The robot will then normally be adapted for seizing an object and conveying it in predetermined direction, for example in the x, y, or z direction. In order to perform allround operation, the robot also has to be disposed for carrying out predetermined rotative movements.

SUMMARY OF THE INVENTION

According to this invention, the robot system comprises a support disposed at one end of the individual displaceable arms of the robot, with a rotative shaft being mounted in said support and carrying a member, for example a disc or flange member, at its end. An additional arm or a gripping means for performing a robot function is disposed on said member, said disc or flange member being rotated upon actuation of said shaft. The shaft is provided with a dog means adapted for being actuated when the shaft is rotated. Furthermore, one or more progressive dampers as well as continuously adjustable mechanical stop means intended for either direction of rotation are disposed on said support, and said dog means is provided with a first member intended for engaging the respective damper and a second member for engaging the respective stop means.

BRIEF DESCRIPTION OF THE DRAWINGS

The invention will be described more specifically below in conjunction with the accompanying drawings, in which FIGS. 1a and 1b shown an embodiment of the robot system in accordance with the invention with the arm being displaceable in a horizontal plane and in which.

DESCRIPTION OF THE PREFERRED EMBODIMENT

Figure 1A:
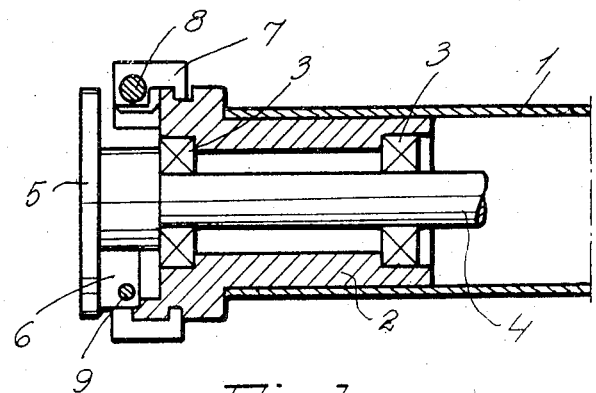
Figure 1B:
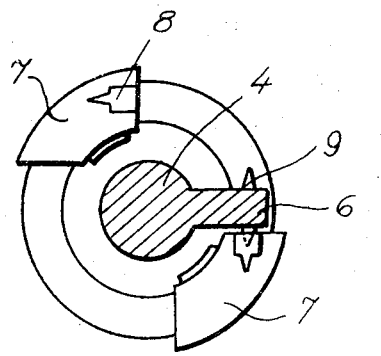

FIGS. 1a and 1b show a portion of a robot arm 1, said arm having quadrangular cross section. A support or a sheath 2 containing two bearings 3 is positioned at the end of the arm. The bearings mount a shaft 4 which is adapted for performing a rotative movement by means of for example a rotative cylinder (not illustrated). A flange or disc 5 is disposed at the end of the shaft and may be provided with seizing means or an additional arm. Furthermore, the end of the shaft is also provided with a dog means 6 which is integral with the shaft and which is provided with members 9, which for example may be pointed, for interacting with damping means. The support 2 includes continuously adjustable mechanical stops 7, one for either direction of rotation. These stops are for preventing the dog means from turning more than a predetermined angle of rotation. Each stop is provided with a recess 8 of a form that may be varied so that it will mate with that of the member 9. Damping material, such as for example polyurethane, is disposed in the recess 8, thereby providing effective damping of the motion of the dog means 6. Thus the dog means will move sychronously with the shaft 4 during the rotative movement of the latter, whereas in the rotation, the member 9 will first engage the damping material in the recess 8, thereby causing damping, and then the damped dog means will engage the stop 7 at the end of the rotative movement.

Figure 2A:
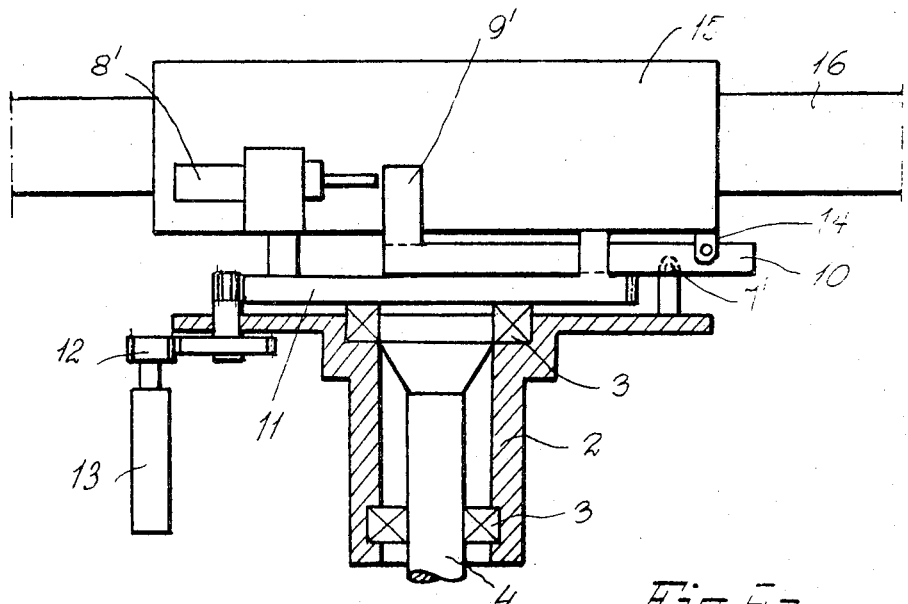
FIGS. 2a, 2b and 2c show another embodiment with the arm being displaceable in a vertical plane.
Figure 2B:
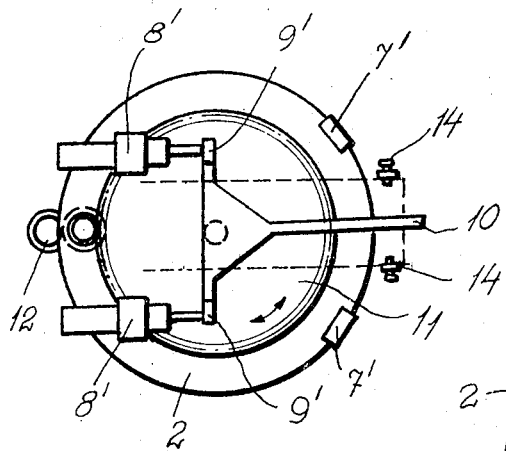
Figure 2C:
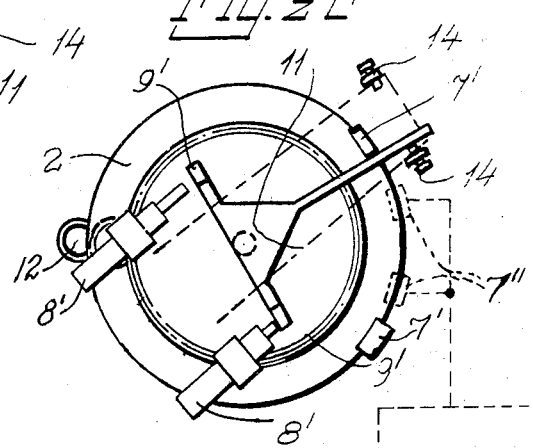

FIGS. 2a, 2b, and 2c illustrate another embodiment, with the device being positioned on a vertically disposed arm. A support is placed at the end of said arm and has here been given the form of a stationary hub housing 2 in which two bearings 3 are located. These bearings support the shaft 4. A toothed disc 11 is carried by the end of the shaft and may be rotated by a motor 13 over gearing 12. The toothed disc 11 carries a support 15 for a movable arm 16, and furthermore the disc is provided with two progressively operating dampers 8', one for either direction of rotation. The support 15 and arm 16, respectively, have been omitted from FIGS. 2b and 2c for the sake of clarity. In the illustrated embodiment, the dog means is provided with three arms, with two of these, designated 9' in the figures, being adapted to actuate the progressive dampers, whereas the third, which is designated 10 in the figures, is adapted to engage the respective adjustable stop means 7'.

Furthermore, the dog means in this embodiment is rotatively disposed with respect to shaft 4. Thus the dog means will be rotated over a predetermined angle, i.e. the angle in which the damper is to be actuated. For this purpose the toothed disc or, as is illustrated in FIG. 2a, the arm support 15 is provided with an adjustable member 14 which will engage the arm 10 on the dog means when the disc is rotated. During this rotation the arm 10 of said dog means will first engage the stop 7'. This will result in the dog means being rotated, and the arm 9' on the dog means will actuate the corresponding damper 8' as is illustrated in FIG. 2c. This actuation is continued until the adjustable member 14 on the arm support 15 on the opposite side of the dog means engages the arm 10, thereby stopping the rotative movement. Thus, during this movement the damper 8' is actuated so as to effectively have damped the movement of the arm 10 when the member 14 engages the arm 10.

The adjustable stop means 7' may be set for each end position of the rotative movement. If desired, additional stops 7" may be disposed between said end positions. In order to make it possible for the arm 10 to pass over the intermediate stop position means 7" the latter may be made such that they may be actuated by for example electric control means 20.

Thus, the arrangements disclosed above make it possible to achieve the damping and stopping of a rotative movement in robots in a simple manner. The members, for example the arms, of the robot will then perform a rotative movement with distinct stop positions, with the movement being effectively damped by the time the stop position is reached.

I claim:

1. A system for damping and subsequently stopping the arcuate travel of a rotating shaft in a robot, said system comprising:
   support means having said rotating shaft mounted therein for arcuate travel relative to said support means,
   means associated with said shaft for performing a robot function responsive to said arcuate travel of said shaft,
   dog means coupled to normally turn in synchronism with the arcuate travel of said shaft unless restrained from so turning,
   stop means for restraining said turning at any selected point in said arcuate travel,
   at least one progressive damper means mounted to rotate with said shaft, and
   means responsive to the restraint applied by said stop means for causing said dog means to engage said progressive damper means whereby the turning of said dog means is brought to a progressively damped stop.

2. A system in accordance with claim 1 and limit means at the selected allowable extremity of said turning for stopping said arcuate travel, said progressive damper means, dog means, and limit means being oriented relative to each other so that said progressive damping means slows said turning before said dog means reaches said limit means.

3. A system in accordance with claim 1 and a plurality of said adjustable stop means for enabling an adjustment to more than two stop positions, and electrical control means for selectively actuating intermediate stop means for enabling the dog means to pass thereover.

4. A system in accordance with claim 1, wherein said dog means are independently rotative over a predetermined angle for damping the rotative movement of said shaft,
   said damper engagement by said dog means comprising two opposing arms one of which engages said progressive damper means depending upon the direction of said turning, and
   said dog means comprising one additional arm thereon for engaging said stop means.

5. A system in accordance wtih claim 4, comprising an adjustable member for adjusting the rotative movement of said dog means relative to said shaft.

References Cited

UNITED STATES PATENTS

| 2,417,434 | 3/1947 | Mead et al. | 192—143 |
| 701,872 | 6/1902 | Giacomini | 192—149 |
| 1,335,263 | 3/1920 | Stroner | 192—149 |
| 1,539,860 | 6/1925 | Nelson | 192—149 |
| 2,505,963 | 5/1950 | Hedenskoog | 188—303 |
| 3,367,460 | 2/1968 | Wanner | 192—149 X |

ALLAN D. HERRMANN, Primary Examiner

U.S. Cl. X.R.

192—143, 149